(12) United States Patent
Ye

(10) Patent No.: US 11,410,012 B2
(45) Date of Patent: Aug. 9, 2022

(54) METHOD OF MANUFACTURING RFID ACCESS CARD FROM NOVEL MATERIALS

(71) Applicant: Global Card Systems Company Ltd., Zhuhai (CN)

(72) Inventor: Xinwen Ye, Zhuhai (CN)

(73) Assignee: Global Card Systems Company Ltd., Zhuhai (CN)

( * ) Notice: Subject to any disclaimer, the term of this patent is extended or adjusted under 35 U.S.C. 154(b) by 83 days.

(21) Appl. No.: 16/947,374

(22) Filed: Jul. 30, 2020

(65) Prior Publication Data
US 2021/0034941 A1 Feb. 4, 2021

Related U.S. Application Data

(60) Provisional application No. 62/960,267, filed on Jan. 13, 2020.

(30) Foreign Application Priority Data

Aug. 1, 2019 (CN) .......................... 201910707414.0

(51) Int. Cl.
| | |
|---|---|
| *G06K 19/077* | (2006.01) |
| *B32B 7/12* | (2006.01) |
| *B32B 21/02* | (2006.01) |
| *B32B 21/04* | (2006.01) |
| *B32B 37/12* | (2006.01) |
| *B32B 38/00* | (2006.01) |
| *G06K 19/07* | (2006.01) |

(52) U.S. Cl.
CPC .......... *G06K 19/07722* (2013.01); *B32B 7/12* (2013.01); *B32B 21/02* (2013.01); *B32B 21/042* (2013.01); *B32B 37/12* (2013.01); *B32B 38/0004* (2013.01); *B32B 38/0012* (2013.01); *G06K 19/0723* (2013.01); *B32B 2519/02* (2013.01)

(58) Field of Classification Search
CPC ............................ G06K 19/07722; B32B 7/12
USPC ........................................................ 235/451
See application file for complete search history.

(56) References Cited

U.S. PATENT DOCUMENTS

| | | | | |
|---|---|---|---|---|
| 5,151,238 A | * | 9/1992 | Earl ................... | C08G 18/6484 264/136 |
| D573,182 S | * | 7/2008 | Ricketts ........................ | D19/10 |
| 2010/0230151 A1 | * | 9/2010 | Michalk ................ | H05K 1/183 174/260 |
| 2015/0339564 A1 | * | 11/2015 | Herslow .................. | C25D 7/00 235/488 |
| 2018/0211147 A1 | * | 7/2018 | Cox ........................ | B32B 27/08 |
| 2019/0198166 A1 | * | 6/2019 | Errico ................. | G07F 17/0092 |
| 2019/0217653 A1 | * | 7/2019 | Endres .................. | B32B 21/042 |

(Continued)

*Primary Examiner* — Allyson N Trail
(74) *Attorney, Agent, or Firm* — MG Miller Intellectual Property Law LLC

(57) ABSTRACT

A method, apparatus, and product-by-process, for preparing an RFID access card constructed out of wood is disclosed. The method involved preparing two wooden surfaces of appropriate thickness, preparing an RFID chip emitting an appropriate frequency, and pressing the wooden surfaces and the RFID chip together through the use of adhesive(s) and a hot press and a cold press. The apparatus included an RFID access card constructed out of at least two wooden surfaces where an RFID chip is disposed between the two surfaces. The two wooden surfaces are attached with a hot melt adhesive.

13 Claims, 3 Drawing Sheets

(56) References Cited

U.S. PATENT DOCUMENTS

2019/0354825 A1* 11/2019 Lowe ............... G06K 19/07773
2020/0398054 A1* 12/2020 Errico .................. G06K 7/1413
2021/0201103 A1*  7/2021 Kodjagueuzian ...... B42D 25/46

* cited by examiner

METHOD OF MANUFACTURING RFID ACCESS CARD FROM NOVEL MATERIALS

CLAIM OF PRIORITY

This application claims priority to U.S. Provisional Patent Application No. 62/960,267 filed on Jan. 13, 2020, entitled "Method Of Manufacturing RFID Access Card From Novel Materials" and Chinese Patent Application No. 201910707414.0 filed on Aug. 1, 2019, entitled "The production method of wooden electronic label card," the contents of both of which are hereby incorporated by reference, including their specifications.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to a method of manufacturing cards containing radio-frequency identification ("RFID") chips. In particular, the present disclosure relates to a method of manufacturing cards containing RFID chips, constructed out of wood.

BACKGROUND

The use of RFID chips has become ubiquitous. Whether used in retail, advertising, manufacturing, or access control, it is easy to look around and find instances of the use of RFID in everyday life.

However, the proliferation of this technology is not without consequence. Specifically, the electronic portion of an RFID tag is created through a metal foil etching process. This results in these chips being incredibly fragile such that they must be encased in a stronger, more rigid material. Frequently, this stronger rigid material is non-biodegradable plastic. However, not only does this plastic create environmental concerns, the manufacture of these plastics can also be incredibly harmful. Moreover, since these plastic RFID units contain two types of materials, these are difficult to recycle since additional time, effort, and expense is required to separate the metal and the plastic for appropriate recycling. A typical 200-room hotel has been reported to produce roughly 12,000 non-biodegradable plastic access cards each year. In total, this amounts to 1,300 tons of plastic (the equivalent of roughly 16 airplanes) being deposited in landfills each year from RFID cards alone.

Furthermore, while some hotels may re-program traditional key cards, during flu season or times of pandemic a hotel may be forced to dispose of traditional non-biodegradable key cards in an effort to decrease contact disease transmission. This not only strains the environment but puts a financial strain on hotels that now must frequently reprint plastic access cards for one-time-use. Additionally, there is a growing need for improved access card security because it has become easier for malicious individuals to copy magnetic strips on traditional access keys. A traditional nondescript plastic key card with a magnetic strip is not only easily fabricated, but also is poor proof that an individual claiming to reside in a hotel room is actually the room's occupant. A non-traditional key card, utilizing RFID and made from wood, would alleviate these security concerns.

Other rigid materials exist that can be used in lieu of plastic, but these materials have certain drawbacks. One attractive candidate is the use of timber or wood to encase the RFID chip. This has the benefit of being a naturally occurring, potentially sustainable, biodegradable material. While wood has these benefits, there exist very real manufacturing challenges to producing such a card. For example, there is a maximum thickness that the encasement of the RFID chip can have while still operating. However, it is very difficult to obtain wood of this thickness that will retain its shape. Further, many types of adhesives used for wood will affect the ability of the RFID chip to operate.

As such, there is a need for a method that can be used to create RFID access cards that are beneficial to the environment, as such a method does not currently exist.

It is an object of the present invention to provide a method of creating wood encasements for RFID chips to create wooden RFID access cards.

The present invention and its embodiments meets and exceeds this objective.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

SUMMARY

The present disclosure provides for a method of producing an RFID access card constructed partially out of wood.

The method begins by first providing a plurality of raw woodchips, which then have a first pressure and a first heat mechanically applied thereto for a period of time. A second pressure is then again mechanically applied for a period of time to create a blank wooden surface.

Once the blank wooden surface has been prepared, a chip hole sized to accommodate an RFID chip is cut by a high-precision laser. The RFID chip is then soldered to the blank wooden surface. An adhesive tape is then placed on the soldered blank wooden surface and RFID chip. From there, a second blank wooden surface is placed on the adhesive tape to create an untreated member. This untreated member is then laminated and pressed at 120° C. by a laminating machine, to create a laminated member.

The laminated member is subsequently grinded, polished, and any ash is removed to create an uncut card. The uncut card is then cut to a predetermined size to create the wooden RFID access card. In some embodiments, the resulting card emits a frequency in the range of 12.7 MHz to 13.5 MHz or 13.8 MHz to 14.2 MHz. In other embodiments, a graphical image is disposed on one surface of the wooden RFID access card, preferably through the use of laser etching or silk screening. Preferably, the first pressure and the first heat are applied to the raw woodchips for a period of 10 minutes. In a further embodiment, the first pressure applied is 0.1 Mpa and the first heat applied is in the range of 115° C. to 125° C. A preferable embodiment applies a second pressure and a second heat on the raw woodchips for a period of 10 minutes. Further, there is an embodiment where the second heat is room temperature. In another embodiment, the RFID chip is soldered to the blank wooden surface through the utilization of bump welding technology.

The present disclosure also teaches an RFID access card, the RFID access card comprising a first blank wooden surface and a second blank wooden surface, each having a thickness less than 0.4 mm, an RFID chip disposed between the first blank wooden surface and the second blank wooden surface, the RFID chip soldered to the first blank wooden surface, the first blank wooden surface and the second blank wooden surface attached with hot melt adhesive. In some embodiments the first blank wooden surface and the second blank wooden surface have a thickness between 0.3 mm and 0.4 mm. In some embodiments the RFID access card further comprises an intermediate layer of wood disposed between the first blank wooden surface and the second blank wooden surface. In a further embodiment, the intermediate layer is between 0.3 mm and 0.4 mm thick. In another embodiment, the RFID access card is laminated. Further, there is an embodiment where the RFID access card is graphically engraved in at least one of the following manners: laser engraving, silk screen printing, or color printing.

The present enclosure also teaches the product of an RFID access card which is partially constructed out of wood, which is constructed by the process of: applying a first pressure and a first heat to the plurality of raw wood chips, mechanically applying a second pressure and a second heat to the plurality of raw wood chips, cutting a chip hole on a portion of the blank wooden surface, by a high-precision laser machine, wherein the chip hole is sized to accommodate an RFID chip, soldering the RFID chip to the blank wooden surface, disposing an adhesive tape to the soldered blank wooden surface and RFID chip, placing a second blank wooden surface on the adhesive tape to create an untreated member, laminating and pressing the untreated member at 120° C., by a laminating machine to create a laminated member, grinding, polishing, and removing any ash from the laminated member to create an uncut card, cutting the uncut car, to a predetermined size to create a cut card.

The main purpose of the present invention is to provide the wooden electronics marks that one can guarantee properties of product and quality stability.

It is noted that in various embodiments, the RFID chip is pressure-bonded to the wood. This is due to the small thickness of the wood used to envelop the RFID chip, and the natural nature of the wood, including its brittleness and malleability, as well as the fact that an aluminum-etched RFID chip is not naturally adhered to wood.

In various embodiments, the wooden RFID access card is constructed out of two wood surfaces having a thickness of 0.3 mm-0.4 mm, a hot melt adhesive film, which is preferably HY-7085M, an aluminum-etched RFID chip, and an adhesive layer, which is preferably a 3M polyester film.

In various embodiments, the wood layer can be selected from a variety of natural and environmentally friendly woods. In other embodiments, the graphical image that gets disposed on the wooden RFID access card is created through processes like polishing, engraving, silk screen printing, and/or hollowing.

An aspect of an example embodiment in the present disclosure is to provide a method of manufacturing an RFID access card constructed out of wood or synthetic wood.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

While these units may be suitable for the particular purpose employed, or for general use, they would not be as suitable for the purposes of the present disclosure as disclosed hereafter.

In the present disclosure, where a document, act, or item of knowledge is referred to or discussed, this reference or discussion is not an admission that the document, act, item of knowledge, or any combination thereof that was known at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed. It is contemplated that the claims may encompass one or more of the conventional technical aspects discussed herein.

BRIEF DESCRIPTION OF THE PREFERRED EMBODIMENTS

In the drawings, like elements are depicted by like reference numerals. The drawings are briefly described as follows.

Figure 1:
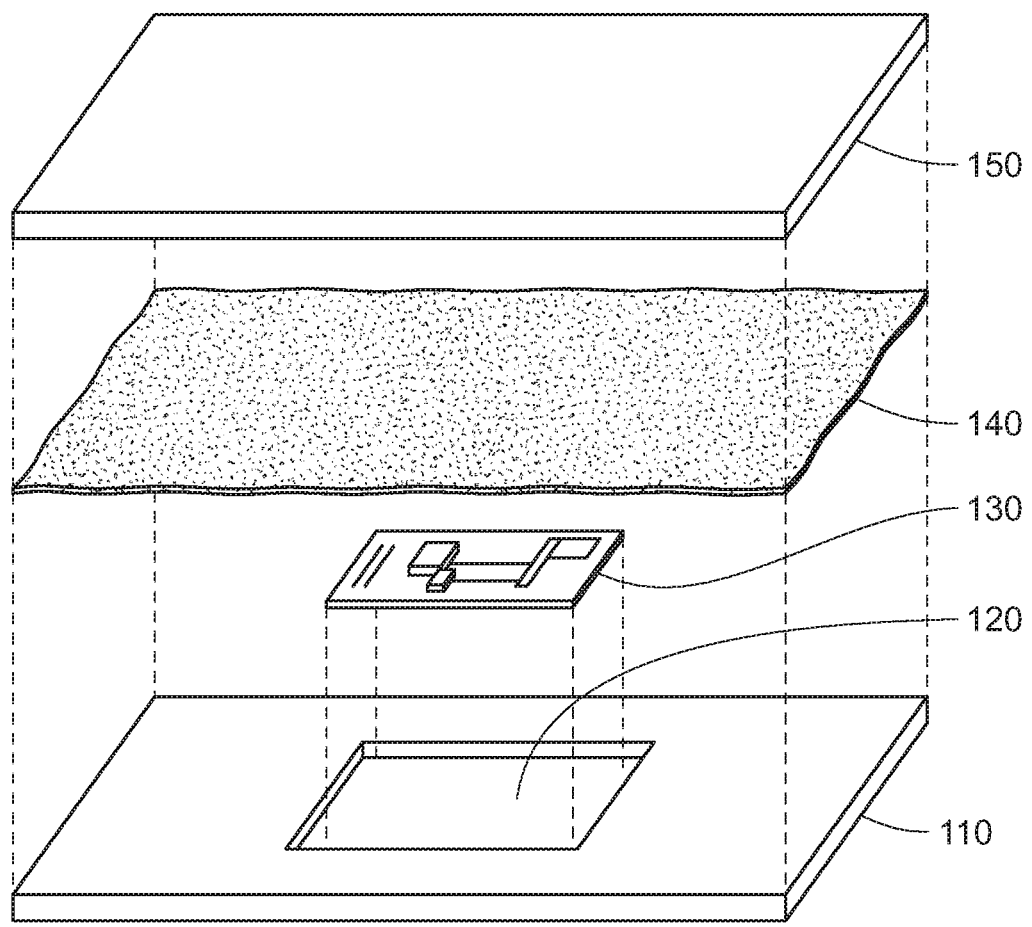
FIG. 1 is a front perspective exploded view of an embodiment of an untreated member in accordance with the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited hereto. In fact, those of ordinary skill in the art may appreciate upon reading the present specification and viewing the present drawings that various modifications and variations can be made thereto.

Exhibited below are several solutions for solving the problems associated with manufacturing an RFID access card made partially from wood and the problem of environmentally hazardous access cards.

FIG. 1 shows an embodiment of the RFID access card 100 according to the present disclosure. As shown in FIG. 1, the RFID access card 100 includes the first blank wooden surface 110, a chip hole 120, the RFID chip 130, an adhesive tape 140, and the second blank wooden surface 150. This embodiment of the RFID access card 100 includes a top surface 100A and a bottom surface 100B. Of note here is the composition of the first blank wooden surface 110 and the second blank wooden surface 150. In the embodiments shown in FIG. 1 the first blank wooden surface 110 and the second blank wooden surface 150 are constructed of wood, synthetic wood, or a mixture of wood and synthetic wood. In a preferred embodiment the chip hole 120 is cut into the first blank wooden surface with a high-precision laser cutter. Preferably, the chip hole 120 is sized to accommodate the RFID chip 130. In an alternative embodiment the chip hole 120 is sized larger than the RFID so that the chip hole 120 can accept additional components.

Figure 2:
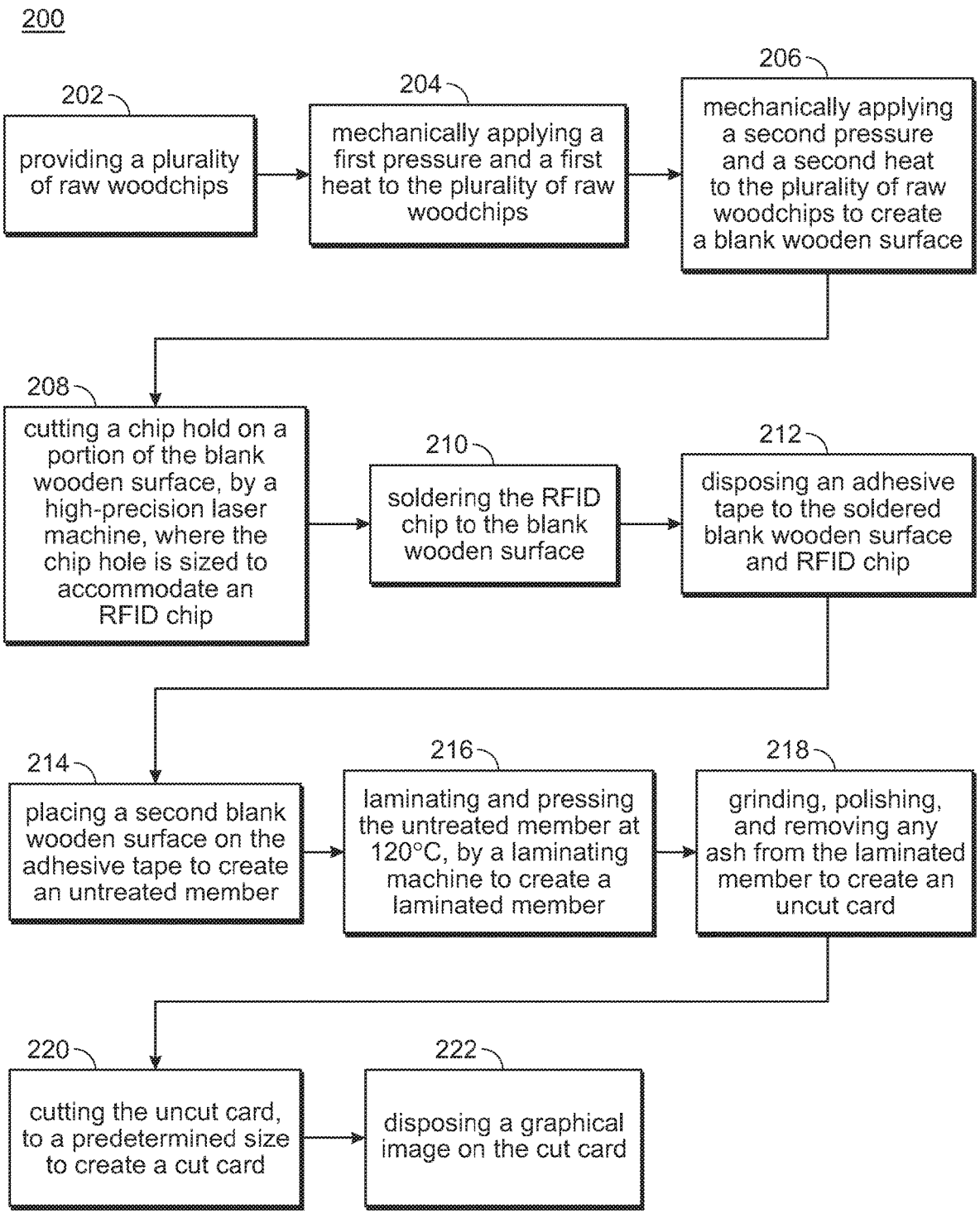
FIG. 2 is a flow chart showing an embodiment of the method of manufacturing an RFID access card partially made from wood in accordance with the present disclosure.

FIG. 2 shows a flow chart showing an embodiment of the method of manufacturing the RFID access card partially made from wood in accordance with the present disclosure. This embodiment of method 200 begins with step 202. There, a plurality of raw wood chips is provided. Preferably, the raw wood chips are comprised of linden, bamboo, beech, cherry, apple, walnut, any other natural wood, or a synthetic wood. Alternatively, the raw woodchips may be comprised of a combination of one or more of linden, bamboo, beech, cherry, apple, walnut, any natural wood, or synthetic wood.

In step 204, a first pressure and a first heat are mechanically applied to the plurality of raw woodchips. Preferably, the first pressure and the first heat are applied to the plurality of raw woodchips for a period of 10 minutes. There are further embodiments of the method 200 where the first pressure and first heat are applied for less than 10 minutes or more than 10 minutes. Further, a preferred embodiment of step 104 dictates a first pressure of 0.1 Mpa and a first heat in the range of 115° C. to 125° C. However, depending on the composition of the plurality of raw woodchips, there may be instances when the method 200 requires a different first pressure. In such a case, the first pressure may be greater or less than 0.1 Mpa. Furthermore, there may be instances when the method 200 requires additional heat. In such a case, the first heat may be greater than 125° C.

In step 206, a second pressure and a second heat are mechanically applied to the plurality of raw wood chips. Preferably, the second pressure and the second heat are applied to the plurality of raw wood chips for a period of 10 minutes. There are further embodiments of the method 200 where the second pressure and the second heat are applied for less than 10 minutes or more than 10 minutes. Further, a preferred embodiment of step 206 dictates a first pressure of 0.1 Mpa and a first heat of room temperature. However, depending on the composition of the plurality of raw woodchips, there may be instances when the method 200 requires additional pressure. In such a case, the second pressure may be greater or less than 0.1 Mpa. Furthermore, there may be instances when the method 200 requires additional heat. In such a case, the second heat may be greater than room temperature. Preferably, the first blank wooden surface is less than 0.4 mm thick. However, in other embodiments, the first blank wooden surface is 0.3 mm to 0.4 mm thick.

In step 208, a chip hole is cut into the blank wooden surface. Preferably, the cut is performed with a high-precision laser. However, further embodiments may cut the chip hole using a torch, friction, a chisel, a CNC machine, or other methods. In a preferred embodiment the chip hole is sized to accommodate an RFID chip. Alternatively, the chip hole can be cut to a size larger than the RFID chip. In such a case the chip hole can be fitted with the RFID chip and additional components. These additional components may include a second RFID chip, an LED, a battery or other power supply, a speaker, a microcomputer chip, an accelerometer, a vibration motor, or other similar electronic components.

In step 210 the RFID chip is attached to the blank wooden surface. In a preferable embodiment, the RFID chip is soldered using bump-welding technology. In alternate embodiments, this step is performed with epoxy, adhesives, other chemical fasteners, or is simply disposed between the first and second blank wooden surfaces without fastening.

In step 212 an adhesive tape is disposed on to the soldered blank wooden surface containing the RFID chip. In a preferred embodiment the soldered blank wooden surface containing the RFID chip is covered with adhesive tape HY-7085M. In alternate embodiments, the soldered blank wooden surface containing the RFID chip is covered with 3M PET (polyester film) glue, other wood glues, epoxies, or other bonding agents.

In step 214 a second blank wooden surface is placed on the adhesive tape and the blank wooden surface to create an untreated member. Preferably, the second blank wooden surface is 0.3 mm-0.4 mm thick. However, in alternative embodiments the second blank wooden surface is less than 0.3 mm thick.

In step 216 the untreated member is laminated and pressed to create a laminated member. Preferably, the untreated member is pressed at 120° C. by a laminating machine to create a laminated member. However, in an alternative embodiment the untreated member is laminated manually without the use of a laminating machine.

In step 218 the laminated member is grinded, polished, and ash is removed, to create an uncut card. In preferred embodiments, the laminated member is ground with a rotary grinder, an angle grinder, a wheel grinder, a motorized carving wheel, or other power grinders. In an alternative embodiment, the laminated member is ground manually. In preferred embodiments the laminated member is polished with wood polish, lacquer, varnish, shellac, wax, a vinegar and water mixture, or other polishing agents. Preferably, the laminated member is polished with a power buffer, a power grinder fitted with a polishing wheel, or other powered polishing tools. However, in alternative embodiments the untreated member is polished manually. In preferred embodiments the ash is removed from the untreated member with a vacuum. In alternative embodiments, ash is removed from the untreated member manually. Further embodiments employ bio-degradable and environmentally friendly agents for polishing the laminated member.

In step 220 the uncut card is cut to a predetermined size to create a cut card. In a preferred embodiment, a plurality of cut cards exist on the same sheet of material and the plurality of cards is cut simultaneously by an industrial cutting machine. Alternatively, the uncut cards are cut manually and/or individually.

In step 222 the cut card has a graphical image disposed upon it. Preferably, the graphical image is disposed on the outside surface of the first blank wooden surface. However, in other embodiments the graphical image is disposed on the outside surface of the second blank wooden surface. In further embodiments graphical images are disposed on both the first blank wooden surface and the second blank wooden surface. Preferably, the graphical image is created with a laser etching device. In alternative embodiments the graphical image is created with wood burning implements, silk screening, color printing, wood carving, or an engraving machine.

Figure 3:
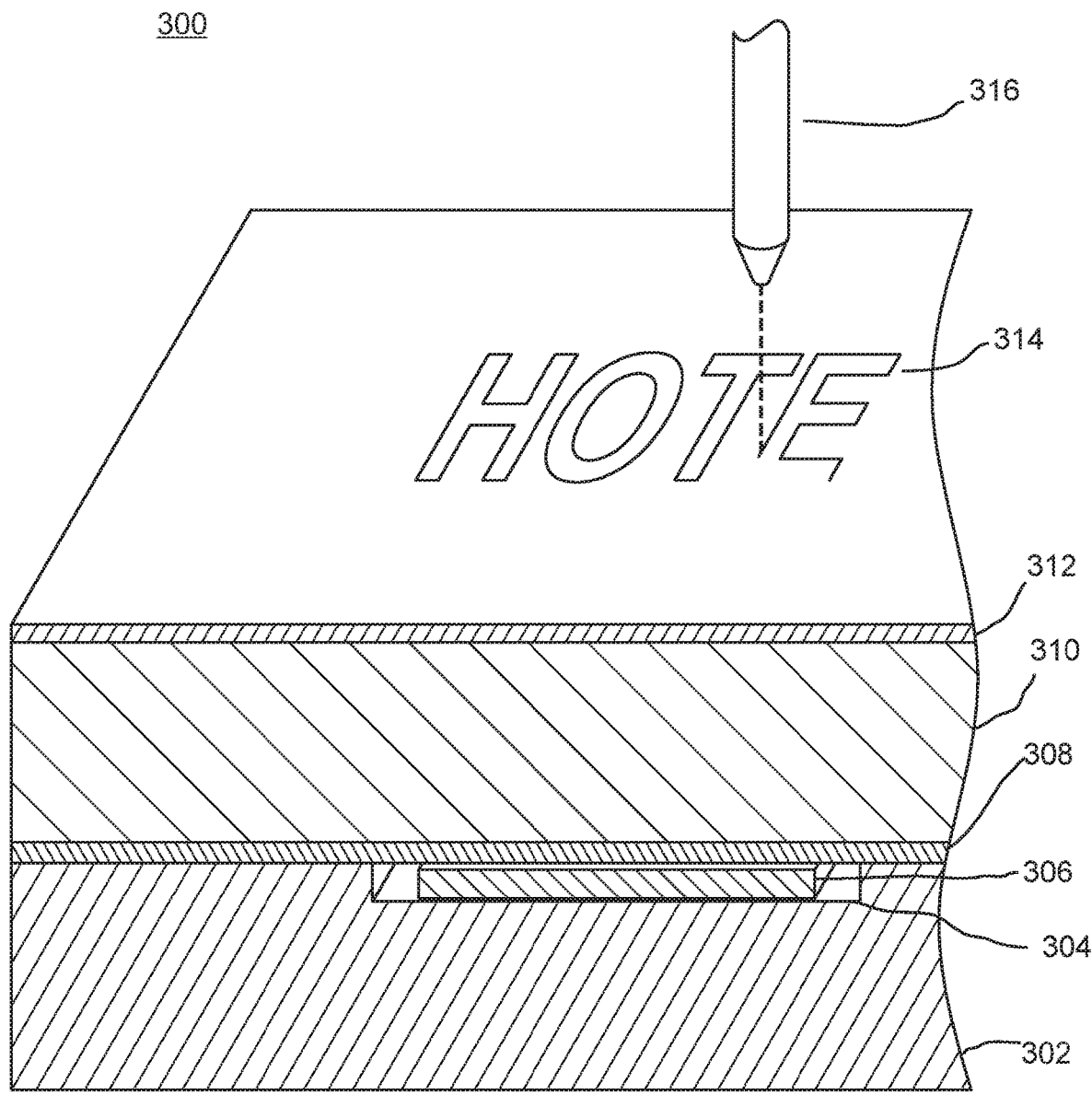
FIG. 3 is a front perspective sectional view of an embodiment of an RFID access card in accordance with the present disclosure.

FIG. 3 shows an alternative embodiment of the RFID access card in accordance with the present disclosure. As shown in FIG. 3 the RFID access card 300 includes, a first blank wooden surface 302, a chip hole 304, an RFID chip 306, adhesive tape 308, a second blank wooden surface 310, laminate 312, a graphical image 314, and a laser etching device 316. Preferably, the laminate 312 is pressed by laminate machine at 120° C. However, the laminate 312 may also be applied manually and at a range of temperatures. Preferably, graphical image 314 is created with the use of a laser etching device 316. However, in alternative embodiments graphical image 314 is created with wood burning implements, silk screening, color printing, wood carving, or an engraving machine. In preferable embodiments, the graphical image 314 is a graphical representation of the business or hotel that owns the RFID access card. In alternative embodiments, the graphical image 314 is a graphical representation of a third party, specifically a means of providing advertising space for a third party. In some embodiments the laminate 312 is pressed around every surface of the RFID access card 300. In other embodiments, the laminate 312 is pressed around a single surface of the RFID access card 300.

As shown in FIGS. 4-12, the present invention is method of manufacturing a wooden RFID access card having two wooden surfaces enveloping an aluminum-etched RFID chip, all of which are bonded through a hot melt adhesive film and a polyester film. Preferably, the two wooden surfaces have a thickness between 0.3 mm-0.4 mm, and the hot melt adhesive film has a melting point of 85° C. In some embodiments, there is an intermediate layer of wood having a thickness of 0.4 mm.

In various embodiments, the method begins by providing some raw material, which can be thinly cut wood or unprocessed woodchips. This raw material is pressed into one or more blank wooden surfaces to be used in the remainder of the method of manufacture in accordance with the present disclosure. Preferably this pressing is performed by two 2 mm steel plates, exerting a pressure of 0.1 MPa, at a temperature of 120° C., for a period of 10 minutes, and then subsequently pressing at 0.1 MPa, by two cooled steel plates, for a period of 25 minutes.

In some embodiments, the method proceeds to cut these one or more blank wooden surfaces to a predetermined size. Preferably, the side of these cut wooden surfaces are twice as large as an RFID chip to be integrated into said surface(s). In other embodiments, this cutting is performed after an RFID chip has been adhered to an enveloped by the blank wooden surfaces.

Preferably, the RFID chip used in the method of manufacture in accordance with the present disclosure will have dimensions of 25 mm×40 mm, and the RFID chip is soldered to the wooden surface using bump welding technology. A polyester adhesive film is used to further adhere the RFID chip to the blank wooden surface(s). Note that the use of this film will drop the emitted frequency of the RFID chip by 1.8-2 MHz, but through the use of pressing can limit the frequency drop to 0.4-0.5 MHz. This will preferably yield a completed RFID access card that emits a radio frequency in the range of 14.2-14.4 MHz.

A second blank wooden surface is disposed on hot melt adhesive tape which is placed on the prepared wooden surface and RFID chip. This assembly is then laminated and pressed at 0.1 MPa, at a temperature in the range of 110° C. to 120° C. for a period of 10 minutes, and is then pressed against at 0.1 MPa at room temperature for a period of 25 minutes to create the completed card. This completed card can be modified for a particular purchaser's needs, such as cutting the card into a stylized shape, or printing, engraving, hollowing, or stamping an image onto the completed wooden access card.

The present disclosure also contemplated the use of synthetic woods to create the wooden RFID access card. In these embodiments, the hot melt adhesive layer covers both sides of the blank wooden surface, which are then placed in a laminating equipment for pressing. The laminating equipment will exert pressure in the range of 0.1-0.2 MPa, at 120° C. for a period of 30 minutes. In the event that a laminated card required further processing to remove semi-finished materials, it will be grinded, polished, and will have any excess ash removed.

The frequencies described in this experiment are all measured by the same spectrum analyzer, and the chips and coils are the same batch.

There are a number of considerations that must be made to produce a wooden RFID access card in accordance with the present disclosure. One consideration is the temperature applied to said access card during the steps that involve the application of heat and/or pressure. Incorrect amounts of pressure or heat can contribute to unnecessary internal stress within the blank wooden surface, or can unnecessarily dehydrate the raw wooden material. However, by applying pressure at 0.1 MPa, it is possible to create uniformity within the blank wooden surface prepared from the raw wooden material. Further, it is important that when heat is applied, it is within the range of 115° C. to 125° C. to avoid unnecessary degradation of any wooden components.

Subsequent applications of pressure at room temperature assist with uniformity in the blank wooden surfaces. These room temperature applications can be performed for longer period of times or lower temperatures to address impurities in the raw material or impurities that arise during the manufacturing process.

When selecting the types of materials to be used in the wooden RFID access card in accordance with the present disclosure, it can be beneficial to consider the direction of the grain of the raw material being used. Since wood is resistant to bending along its grain, the direction of the grain can be selected to improve the durability of the card.

In various embodiments, the hot melt adhesive film that is used is a TPU hot melt adhesive film. This is beneficial because of the elasticity and flexibility of TPU hot melt adhesive film. This is also beneficial because TPU provides strong bonding and is waterproof.

In various embodiments, the following types of woods can be used: linden, bamboo, beech, cherry, apple, walnut, and synthetic wood. In other embodiments, a 14.4 MHz Gum Dry Inlay-type product, serves as the adhesive-layer between electronic tag paper and blank wooden surface. PET Double-face gummed paper can guarantee enough adhesion strength between the layers, contains a plastic basis material, and processing performance is more preferable and facilitates the stability of the resulting access card.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented a method of manufacturing cards containing radio-frequency identification ("RFID") chips, as well as a disclosure of the apparatus of said RFID chip, constructed partially out of wood. In particular, the present disclosure relates to a method of manufacturing cards containing RFID chips, constructed out of wood. The disclosure is illustrated by example in the drawing figures, and throughout the written description. It should be understood that numerous variations are possible while adhering to the inventive concept. Such variations are contemplated as being a part of the present disclosure.

What is claimed is:

1. A method of producing an RFID access card constructed partially out of wood, comprising the steps of:
   providing a plurality of raw woodchips;
   mechanically applying a first pressure and a first heat to the plurality of raw woodchips;
   mechanically applying a second pressure and a second heat to the plurality of raw woodchips for a period of time to create a blank wooden surface;
   cutting a chip hole on a portion of the blank wooden surface, by a high-precision laser machine,
      wherein the chip hole is sized to accommodate an RFID chip;
   soldering the RFID chip to the blank wooden surface;
   disposing an adhesive tape to the soldered blank wooden surface and RFID chip;
   placing a second blank wooden surface on the adhesive tape to create an untreated member;
   laminating and pressing the untreated member at 120° C., by a laminating machine to create a laminated member;
   grinding, polishing, and removing any ash from the laminated member to create an uncut card,
   cutting the uncut card, to a predetermined size to create a cut card.

2. The method of claim 1, wherein the first pressure and the first heat is applied to the plurality of raw wood chips for a period of time of 10 minutes.

3. The method of claim 1, wherein the first pressure is 0.1 Mpa.

4. The method of claim 1, wherein the first heat is in the range of 115° C. to 125° C.

5. The method of claim 1, wherein the second pressure and the second heat is applied to the plurality of raw wood chips for 10 minutes.

6. The method of claim 5, wherein the second heat is room temperature.

7. The method of claim 1, wherein the RFID chip is soldered to the blank wooden surface through the utilization of bump welding technology.

8. The method of claim 1, wherein the RFID chip has a frequency in the range of 13.8 MHz to 14.2 MHz.

9. The method of claim 1, wherein the RFID chip has a frequency in the range of 12.7 MHz to 13.5 MHz.

10. The method of claim 1 further comprising the step of:
    disposing a graphical image on the cut card to create the RFID access card.

11. An RFID access card comprising:
a first blank wooden surface, the first blank wooden surface having a thickness less than 0.4 mm,
a second blank wooden surface, the second blank wooden surface having a thickness less than 0.4 mm;
an RFID chip disposed between the first blank wooden surface and the second blank wooden surface,
wherein the RFID is soldered to the wooden surface and the first wooden surface and the second wooden surface are attached with hot melt adhesive; and
an intermediate layer of wood disposed between the first blank wooden surface and the second blank wooden surface.

12. The apparatus of claim 11 wherein the intermediate layer has a thickness of 0.4 mm.

13. An RFID access card which is constructed partially out of wood, having a thickness no greater than 0.4 mm, made by a process comprising the steps of:
providing a plurality of raw wood chips;
mechanically applying a first pressure and a first heat to the plurality of raw wood chips;
mechanically applying a second pressure and a second heat to the plurality of raw wood chips to create a blank wooden surface;
cutting a chip hole on a portion of the blank wooden surface, by a high-precision laser machine,
wherein the chip hole is sized to accommodate an RFID chip;
soldering the RFID chip to the blank wooden surface;
disposing an adhesive tape to the soldered blank wooden surface and RFID chip;
placing a second blank wooden surface on the adhesive tape to create an untreated member;
laminating and pressing the untreated member at 120° C., by a laminating machine to create a laminated member;
grinding, polishing, and removing any ash from the laminated member to create an uncut card;
cutting the uncut card, to a predetermined size to create a cut card.

\* \* \* \* \*